(12) United States Patent
Rowe et al.

(10) Patent No.: US 8,943,876 B2
(45) Date of Patent: Feb. 3, 2015

(54) SHAFT BREAK DETECTION

(75) Inventors: Arthur Laurence Rowe, Derby (GB); Stephen Granville Garner, Ashby-de-la-Zouch (GB); Marko Bacic, Oxford (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/984,571

(22) PCT Filed: Feb. 24, 2012

(86) PCT No.: PCT/EP2012/053135
§ 371 (c)(1),
(2), (4) Date: Aug. 9, 2013

(87) PCT Pub. No.: WO2012/119864
PCT Pub. Date: Sep. 13, 2012

(65) Prior Publication Data
US 2013/0319092 A1    Dec. 5, 2013

(30) Foreign Application Priority Data

Mar. 9, 2011   (GB) .................................. 1103989.8

(51) Int. Cl.
| | |
|---|---|
| G01M 15/14 | (2006.01) |
| F02C 7/00 | (2006.01) |
| F01D 21/00 | (2006.01) |
| F01D 21/04 | (2006.01) |
| F01D 21/06 | (2006.01) |
| G01M 13/02 | (2006.01) |
| G01M 15/04 | (2006.01) |
| G01H 1/00 | (2006.01) |

(52) U.S. Cl.
CPC ................ *F02C 7/00* (2013.01); *F01D 21/003* (2013.01); *F01D 21/045* (2013.01); *F01D 21/06* (2013.01); *G01M 13/02* (2013.01); *G01M 15/046* (2013.01); *G01M 15/14* (2013.01); *G01H 1/006* (2013.01); *F05D 2270/021* (2013.01); *F05D 2270/09* (2013.01); *F05D 2270/091* (2013.01); *F05D 2270/304* (2013.01); *F05D 2270/335* (2013.01)
USPC ..................................... 73/112.01; 73/112.06

(58) Field of Classification Search
USPC .......................................... 73/112.01, 112.06
See application file for complete search history.

(56) References Cited

U.S. PATENT DOCUMENTS

| | | |
|---|---|---|
| 4,454,754 A | 6/1984 | Zagranski et al. |
| 4,651,563 A | 3/1987 | Zweifel |

(Continued)

FOREIGN PATENT DOCUMENTS

| | | |
|---|---|---|
| FR | 2 921 974 A1 | 4/2009 |
| JP | A 2007-108189 | 4/2007 |
| WO | WO 99/64727 AI | 12/1999 |

OTHER PUBLICATIONS

Mar. 29, 2011 Search Report issued in British Patent Application No. GB1103989.8.

(Continued)

*Primary Examiner* — Freddie Kirkland, III
(74) *Attorney, Agent, or Firm* — Oliff PLC

(57) ABSTRACT

A shaft break detection system and a method of detecting shaft break for a gas turbine engine. A first indication is calculated from measured rotational speed of a shaft. A second indication is calculated from the rotational speed. A shaft break signal is generated if both indications are true.

19 Claims, 3 Drawing Sheets

(56) References Cited

U.S. PATENT DOCUMENTS

| | | | |
|---|---|---|---|
| 4,712,372 A | | 12/1987 | Dickey et al. |
| 5,293,774 A | * | 3/1994 | Ratherham ................ 73/112.01 |
| 6,321,525 B1 | | 11/2001 | Rogers |
| 6,494,046 B1 | * | 12/2002 | Hayess ............................ 60/779 |
| 7,735,310 B2 | * | 6/2010 | Metscher ................... 60/39.091 |
| 7,758,301 B2 | * | 7/2010 | Bilson et al. ..................... 415/14 |
| 8,172,509 B2 | * | 5/2012 | Bart et al. ..................... 415/118 |
| 2003/0091430 A1 | * | 5/2003 | Mulera et al. .................. 415/14 |
| 2008/0083280 A1 | | 4/2008 | Filbry |
| 2013/0133333 A1 | * | 5/2013 | Bacic .............................. 60/779 |
| 2013/0152600 A1 | * | 6/2013 | Rowe .............................. 60/779 |
| 2013/0312423 A1 | * | 11/2013 | Bacic et al. ..................... 60/779 |

OTHER PUBLICATIONS

Jul. 4, 2012 Search Report issued in International Patent Application No. PCT/EP2012/053135.

Jul. 4, 2012 Written Opinion issued in International Patent Application No. PCT/EP2012/053135.

* cited by examiner

SHAFT BREAK DETECTION

The present invention relates to detecting shaft break, particularly but not exclusively to detecting shaft break in a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32. The fan 14 is coupled to the low pressure turbine 26 by a low pressure shaft 34. The intermediate pressure compressor 16 is coupled to the intermediate pressure turbine 24 by an intermediate pressure shaft 36. The high pressure compressor 18 is coupled to the high pressure turbine 22 by a high pressure shaft 38.

In rare circumstances one of the shafts 34, 36, 38 may break. When this occurs the fan 14 or compressor 16, 18 decelerates rapidly because it is no longer driven. However, the turbine 22, 24, 26 rapidly accelerates because the load on it is substantially reduced. This in turn may cause the turbine disc to burst releasing high energy debris and resulting in catastrophic failure of the engine 10. Where the engine 10 is used to power an aircraft the released high energy debris may not be captured and there is thus a risk of some debris impacting or piercing the fuselage of the aircraft. Therefore there is a need to identify shaft breakages and to shut down the engine 10 quickly by shutting off the fuel supply. Typically a shaft break event must be controlled in less than 1 second or the release of high energy debris cannot be reliably prevented.

One known method of detecting shaft break measures the rotational speed of the shaft, for example the low pressure shaft 34, close to the compressor 18. Typically the rotational speed is sampled at a predetermined sample rate. The method then calculates the rate of change of rotational speed and indicates deceleration greater than a predetermined threshold as detected shaft break. Control equipment then shuts off the fuel supply to shut down the engine 10.

One difficulty in detecting a shaft break using this method is that the deceleration of the fan 14 or compressor 16, 18 is similar to that experienced by the engine 10 during a surge event. However, in order to control an engine surge it is important not to shut down the engine 10, which is a different response to that required to control a shaft break event. Thus it is necessary to accurately distinguish surge and shaft break events so that the correct control response can be triggered.

Another known method of detecting shaft break requires two speed measuring devices for the shaft 34, one located near the fan 14 and one located near the turbine 26. Shaft break is indicated to control equipment if the difference in rotational speed measurement from the two measuring devices is greater than a predetermined threshold. One disadvantage of this method is that it is difficult to implement for the intermediate pressure shaft 36 and high pressure shaft 38 since the desired location for the speed measuring devices near the turbines 22, 24 are at high temperature and are relatively inaccessible for maintenance.

Mechanical shaft break detection methods are also known. However, these may be slower to react than an electronic method and may not be triggered by all causes of shaft breakage. For example, some mechanical devices are triggered by the turbine moving axially rearwards but if the shaft break occurs ahead of the axial location bearing, no axial movement occurs and the device is not triggered.

The present invention seeks to provide a method of detecting shaft break and a shaft break detection system for a gas turbine engine that seeks to address the aforementioned problems.

Accordingly the present invention provides a method of detecting shaft break for a gas turbine engine, comprising the steps of: measuring rotational speed of a shaft of a gas turbine engine; calculating a first indication from the rotation speed; calculating a second indication from the rotational speed; and producing a shaft break signal if the first indication is true and the second indication is true. Advantageously the second indication is confirmatory of the first indication to reduce the incidence of false shaft break signals.

The step of measuring the rotational speed may comprise sampling the rotational speed. The rotational speed may be sampled every 1 to 30 ms. Advantageously this is quick enough for corrective action to be taken before catastrophic failure of the gas turbine engine can occur. The step of measuring the rotational speed of the shaft may comprise measuring the rotational speed near to a compressor of the gas turbine engine. Advantageously the operating conditions near the compressor are more benign than near a turbine of the gas turbine engine.

The first indication may comprise calculating a rate of change of the rotational speed, and the first indication may be true if the rate of change of rotational speed indicates deceleration greater than a threshold. By this is meant that the rotational speed decelerates more quickly than a threshold deceleration rate. Advantageously, deceleration of the rotational speed of the shaft is a good primary indication that the shaft may have broken.

The second indication may comprise calculating a rate of change of rotational speed and performing a frequency analysis thereon, and the second indication is true if the frequency analysis indicates no peak at a first torsional frequency of the shaft and false if the frequency analysis indicates a peak at the first torsional frequency of the shaft. Advantageously, the second indication accurately distinguishes a surge condition from a shaft break condition.

The frequency analysis may be performed by a fast Fourier transform. Alternatively the frequency analysis may be performed by applying a band-pass filter to a range centered on the first torsional frequency. Alternatively the frequency analysis may be performed by applying a low-pass, a high-pass or a Kalman filter to extract a range including the first torsional frequency.

The method may further comprise the step of producing a surge signal if the first indication is true and the second indication is false.

The first torsional frequency may be calculated from inertia of parts of the shaft and torsional stiffness of the shaft.

The second indication may alternatively comprise testing a hypothesis that the shaft and its coupled components behave as a second order system, and the second indication is true if the hypothesis is false. A margin within which to match the hypothesis may be defined for setting the indication true or false. Alternatively the hypothesis may be that the shaft and its coupled components behave as a third order system.

The method may further comprise a step of calculating an additional indication from the rotational speed and modifying the final step of the method to produce a shaft break signal if the first indication, second indication and additional indication are each true. Advantageously there is a further confirmation of the first indication.

The additional indication may comprise measuring shaft vibration, and the additional indication is true if the vibration is greater than a threshold. Alternatively, the additional indication may comprise measuring a second rotational speed, and the additional indication is true if the difference between the rotational speed and the second rotational speed is greater than a threshold. Alternatively the additional indication may comprise testing a hypothesis that the shaft and its coupled components behave as a first order system, and the additional indication is true if the hypothesis is true.

The present invention also provides a shaft break detection system for a gas turbine engine, comprising: a measuring device to measure rotational speed of a shaft; a processor to calculate a first indication from the rotational speed; a processor to calculate a second indication from the rotational speed; and a shaft break signal generator to generate a shaft break signal if the first indication is true and the second indication is true. Advantageously the second indication is confirmatory of the first indication to reduce the incidence of false shaft break signals.

The system may further comprise a fuel shut-off mechanism coupled to the shaft break signal generator, the fuel shut-off mechanism arranged to shut off fuel supply to the engine in response to the shaft break signal. Advantageously shutting off fuel to the engine quickly shuts down the engine to prevent catastrophic release of high energy debris from the engine.

The processor to calculate the first indication and the processor to calculate the second indication may comprise one processor with multiple functions. The processor or one of the processors may be an engine control unit.

The system may also comprise a measuring device to measure a characteristic of the shaft; a processor to calculate an additional indication from the characteristic of the shaft; and the shaft break generator may be arranged to generate the shaft break signal if the first, second and additional indications are each true.

The measuring device may comprise a speed probe to measure rotational speed of the shaft at another location and the additional indication may comprise the difference in rotational speed. Alternatively the measuring device may comprise a pressure measuring device and the additional indication may comprise a change in the pressure over time greater than a predetermined threshold. Alternatively the measuring device may comprise a speed probe to measure rotational speed of a second shaft at another location and the additional indication may comprise the difference in rotational speed.

The present invention also provides a gas turbine engine control system comprising a shaft break system as described. Also a gas turbine engine comprising a gas turbine engine control system as described.

The present invention will be more fully described by way of example with reference to the accompanying drawings, in which.

Figure 1:
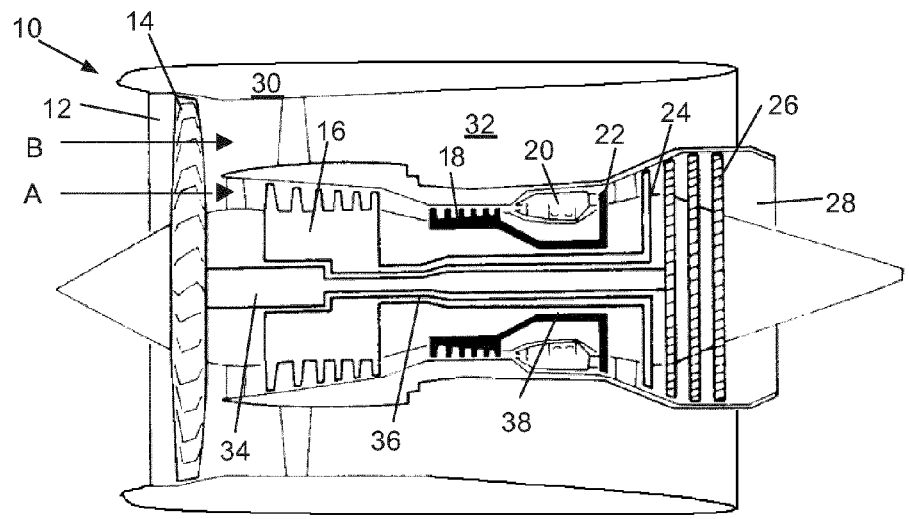
FIG. 1 is a sectional side view of a gas turbine engine to which the present invention is applied.
Figure 2:
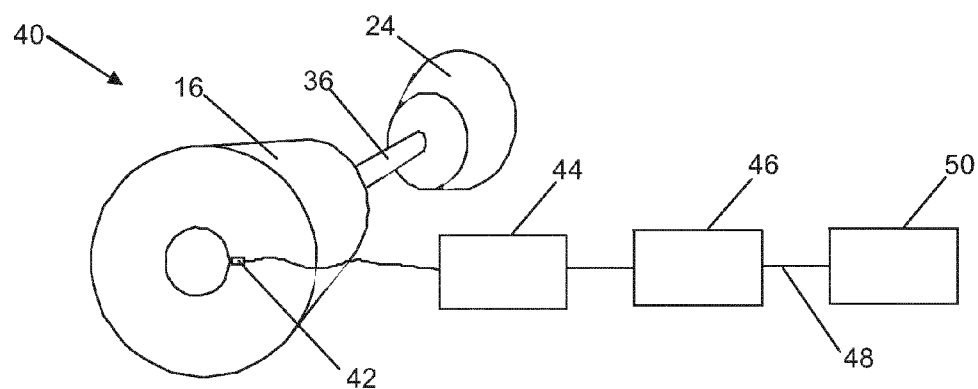
FIG. 2 is a schematic drawing of components of the present invention.

FIG. 2 is a schematic illustration of parts of a shaft break detection system according to the present invention. An intermediate pressure assembly 40 is shown comprising the intermediate pressure compressor 16 coupled to the intermediate pressure turbine 24 by the intermediate pressure shaft 36. A measuring device 42, being a speed probe or other device capable of measuring rotational speed, is provided near to the intermediate pressure compressor 16. The measuring device 42 is arranged to measure the rotational speed of the intermediate pressure shaft 36. The measuring device 42 is coupled to a processor 44. The measuring device 42 may measure the rotational speed substantially continuously or may sample the rotational speed at defined intervals. This interval may be in the range 1 ms to 30 ms. Preferably samples are taken every 5 ms.

The processor 44 receives the measured rotational speed from the measuring device 42 and processes it. Firstly, the processor 44 calculates the rate of change of rotational speed from temporally spaced measurements of the rotational speed, for example between one sample and the next. Secondly, the processor 44 performs frequency analysis on the rotational speed. The rate of change of rotational speed and the frequency analysis are passed to a shaft break signal generator 46 which generates and transmits a shaft break signal 48 if certain conditions are met, as described below. The shaft break signal 48 is transmitted to a fuel shut-off mechanism 50 that is arranged to shut off the fuel supply to the gas turbine engine 10 on receipt of the shaft break signal 48. The processor 44, the shaft break signal generator 46 and the fuel shut-off mechanism 50 may each be a function of an engine control unit or may be separate units.

Figure 3:
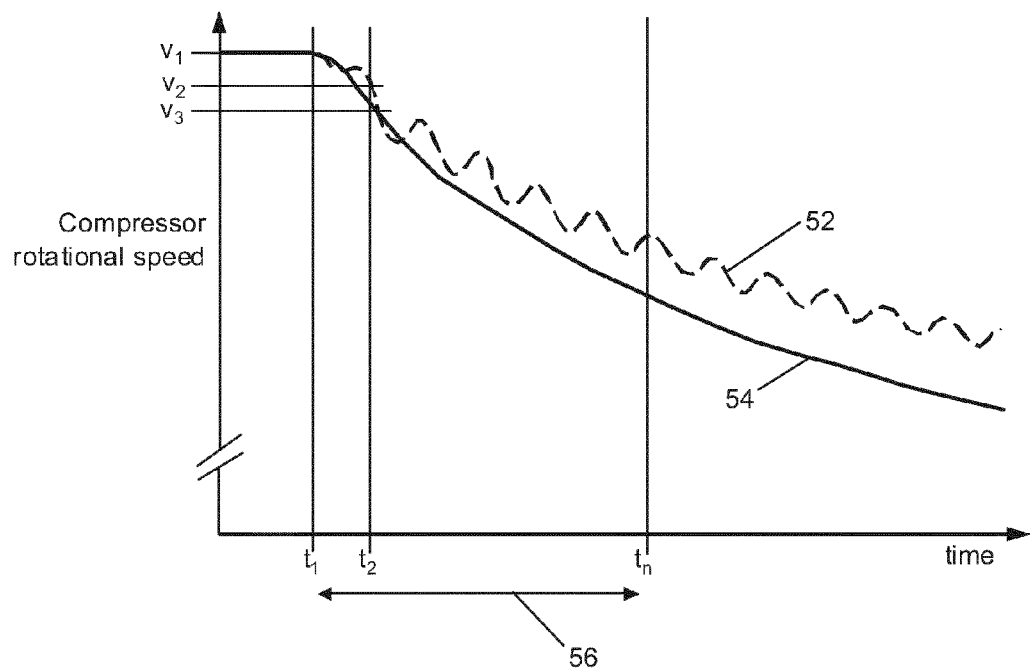
FIG. 3 is a graph of compressor speed for shaft break and surge events.

FIG. 3 is an illustrative plot of compressor speed, measured by the measuring device 42, against time. The dashed line 52 is a representative plot of the behaviour of the compressor speed during a surge event. As can be seen, the underlying trend is that the compressor speed decreases from its initial steady state speed $v_1$ but the speed exhibits oscillations caused by induced vibrations. The measuring device 42 takes a first sample at time $t_1$ and a second sample at time $t_2$. Therefore the oscillations are not apparent, merely the decrease in speed from $v_1$ at time $t_1$ to $v_2$ at time $t_2$.

The solid line 54 is a representative plot of the behaviour of the compressor speed during a shaft break event. As can be seen, the underlying trend is a decrease in speed without oscillations. The measuring device 42 measures $v_3$ at time $t_2$. It is clear from the plot that, depending on the scale and the interval between samples, the difference between $v_2$ and $v_3$ may not be apparent within noise on the signals.

The processor 44 calculates the rate of change of rotational speed using the standard formula $\dot{v}=(v_n-v_1)/(t_2-t_1)$, where $v_n$ may be $v_2$ or $v_3$. A plurality of time intervals from $t_1$ to $t_n$ form a detection period 56. The processor 44 calculates the rate of change of rotational speed for each pair of adjacent samples in the sequence and may also calculate the rate of change of rotational speed over the detection period 56, between the first time $t_1$ in the sequence and the last time $t_n$ in the sequence.

The processor 44 also performs frequency analysis on the plurality of rotational speed measurements $v_1$ to $v_n$ obtained during the detection period 56 to produce a frequency plot. The frequency analysis can be performed by any of a number of well known methods. For example, a fast Fourier transform can be used or a filter applied. Suitable filters include, but are not limited to, band-pass, low-pass, high-pass and Kalman filters. Other methods of performing frequency analysis can be substituted with equal felicity.

Figure 4:
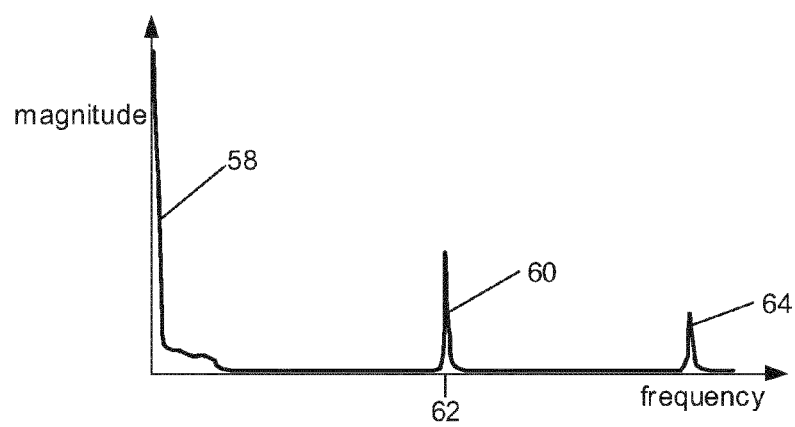
FIG. 4 is a frequency graph for a surge event.
Figure 5:
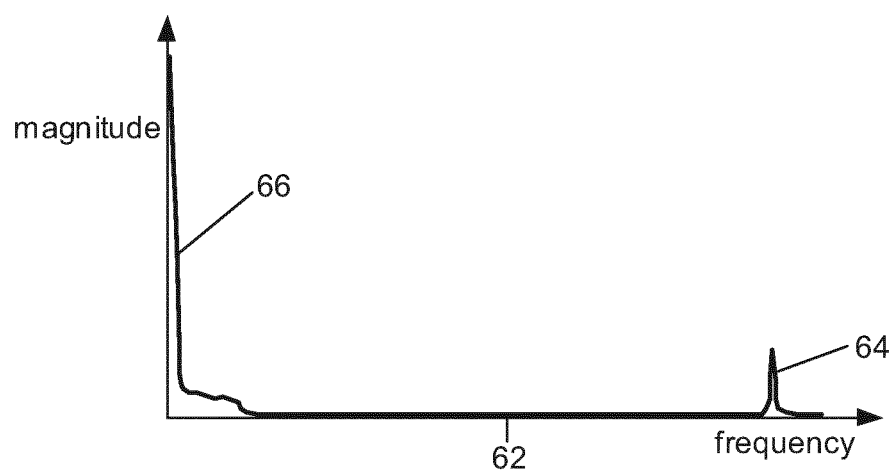
FIG. 5 is a frequency graph for a shaft break event.

FIG. 4 shows a frequency plot derived for the surge event and relates to the dashed line 52 in FIG. 3 whilst FIG. 5 shows a frequency plot derived for the shaft break event and relates to the solid line 54 in FIG. 3. The surge frequency plot 58 of FIG. 4 exhibits a peak or spike 60 at a frequency 62. The frequency 62 corresponds to the first torsional frequency of the intermediate pressure shaft 36 which is preferably stored in the processor 44, in a look up table or otherwise. Beneficially a range centered on the first torsional frequency is stored, for example having limits of ±10%. The first torsional frequency is calculated from the inertia of the intermediate pressure compressor 16, the inertia of the intermediate pressure turbine 24 and from the torsional stiffness of the intermediate pressure shaft 36, all of which are characteristics of the intermediate pressure assembly 40. The surge frequency plot 58 exhibits a further peak 64 that corresponds to another frequency signal, for example a once per revolution signal caused by the compressor 16 or turbine 24 being out of balance.

FIG. 5 shows a shaft break frequency plot 66 that has similarities to the surge frequency plot 58. However, the shaft break frequency plot 66 does not exhibit a peak or spike 60 at the first torsional frequency 62. Thus there is a clear distinction between the surge frequency plot 58 which includes peak 60 and the shaft break frequency plot 66 which does not include the peak 60 at the first torsional frequency 62. The absence of the peak 60 is therefore an accurate differentiator between surge and shaft break events. The shaft break frequency plot 66 does exhibit the further peak 64 as in FIG. 4.

The intermediate pressure assembly 40 is a third order mechanical system. The response can be matched within acceptable accuracy using a second order system model, which is computationally less intensive than modeling a third order system. The following applies for a third order system model mutatis mutandi but is described for a second order system model. When a shaft breakage occurs the intermediate pressure compressor 16 and the remains of the intermediate pressure shaft 36 behave as a first order system. Thus a second order system model can be run as a test hypothesis using the measured rotational speed, and known characteristics of the shaft such as inertia and stiffness, and a random noise element. Whilst the actual system response concurs within a predetermined error to the modeled system response, no shaft break is reported. However, if the actual system response begins to deviate from the modeled system response by more than the predetermined error a shaft break signal can be generated and fuel shut off be instructed. The hypothesis of second order behaviour can be tested using a Kalman filter, a Luenberger observer or another method as will be apparent to the skilled reader. The compressor and/or turbine torque may be input into the test hypothesis or estimated using the random noise element.

Similarly a hypothesis that the intermediate pressure assembly 40 exhibits first order behaviour can be tested. As described above, the intermediate pressure assembly 40 behaves as a first order system when shaft breakage occurs so if the first order hypothesis is true within a predetermined error, then shaft break can be indicated. Thus it can be beneficial to test the second order hypothesis and, if it is false, to subsequently test the first order hypothesis. If the first order hypothesis is true this confirms the deduction that the intermediate pressure shaft 36 has broken and fuel shut-off can be instructed.

An alternative method of verifying that shaft break has occurred when the rate of change of rotational speed indicates deceleration greater than a threshold requires fitting a transfer function to the speed curve shown in FIG. 3. It is necessary to fit the transfer function for just that part of the curve after $t_1$, where the compressor rotational speed is decreasing. The transfer function is determined for a given period, for example detection period 56. For example, a recursive least squares method could be used to fit the transfer function or another method as known to those skilled in the art. Practically it may be easiest to determine the transfer function for a rolling period, for example using the samples from the last 25 ms, but only consider the result for the period in which the rotational speed begins to decelerate. Once a transfer function has been fitted to the rotational speed curve, line 52, 54, the eigenvalues are calculated. If the eigenvalues are complex this indicates oscillation and therefore surge. Conversely, if the eigenvalues are real this indicates smooth deceleration and therefore shaft break.

Figure 6:
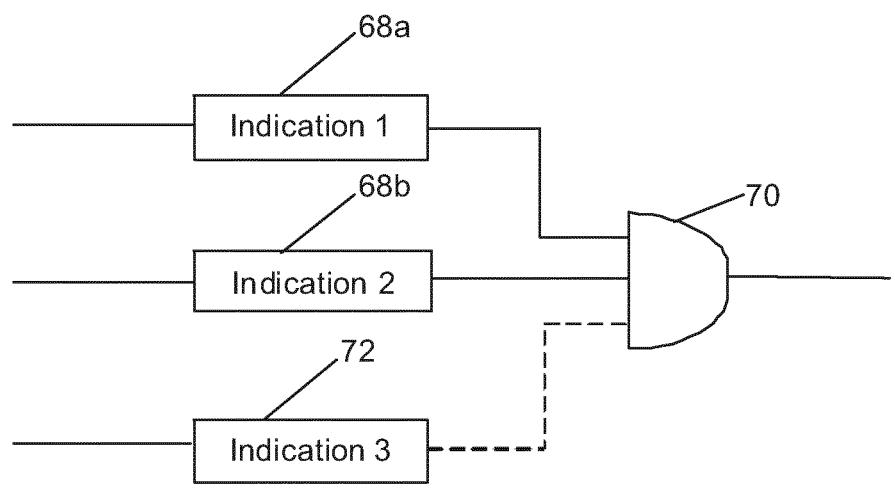
FIG. 6 is a flow diagram of the method of the present invention.

FIG. 6 is a schematic of one embodiment of the logic within the shaft break signal generator 46. Two indications 68a, 68b are provided to an AND gate 70. If the first and second indications 68a, 68b are both set to TRUE, the AND gate 70 generates a TRUE shaft break signal. If either of the first or second indications 68a, 68b is set to FALSE, the AND gate 70 generates a FALSE shaft break signal.

In a first embodiment of the method of the present invention the first indication 68a is set to TRUE if the rate of change of rotational speed is greater than a threshold that is predetermined, therefore indicating that a predetermined deceleration has occurred within the time period, for example detection period 56. The threshold may be a function of an engine power indicator such as compressor exit pressure or corrected shaft speed, or altitude. The indicator may be lagged. The second indication 68b is set to TRUE if the frequency analysis does not exhibit a peak at the first torsional frequency 62. Preferably the first torsional frequency 62 is set as a small range to capture peaks close to but not exactly at the first torsional frequency.

In a second embodiment, the second indication 68b is set to TRUE if the hypothesis of second order behaviour is FALSE, indicating that the system does not mimic a second order system. The first indication 68a is as in the first embodiment.

In a third embodiment, the second indication 68b is set to TRUE if the eigenvalues of the fitted transfer function are real. The first indication 68a is as in the first embodiment.

As shown in FIG. 6, optionally there may be an additional indication 72. This may be a vibration measurement above a threshold. Alternatively, there may be a second measurement device 42 that measures the rotational speed of the intermediate pressure shaft 36 near the intermediate pressure turbine 24, with the processor 44 arranged to calculate the difference in rotational speed between the compressor and turbine. The additional indication 72 would then be set to TRUE if the difference in rotational speed is greater than a threshold.

Alternatively, there may be a second measurement device 42 that measures the rotational speed of another coaxial shaft, for example the high pressure shaft 38. The processor 44 in this case is arranged to calculate the difference in rotational speed between the shafts and the additional indication 72 is set to TRUE if the difference is greater than a threshold. It may be appropriate in some applications to calculate the change from the expected difference in rotational speed of the two shafts, rather than the absolute difference in rotational speed.

For the second embodiment of the second indication 68b, being the hypothesis of a second order system, the additional indication 72 may be the hypothesis of a first order system.

Although the first indication 68a and the second indication 68b have been shown as parallel inputs to the AND gate 70, the logic may be arranged so that the indications 68a, 68b are in series. Thus only if the first indication 68a is TRUE is the second indication 68b considered. In this case the optional additional indication 72 could be provided in series following the first and second indications 68a, 68b or in parallel with them.

Advantageously the shaft break detection system and method of the present invention enables accurate and rapid detection of shaft breakage. The present invention offers a plurality of second indications 68b so that it is able to reliably distinguish shaft break from surge or other engine events that require different control responses so that the engine 10 is not erroneously shut down.

Although exemplary signal processing techniques have been suggested herein, it will be apparent to the skilled reader that alternative signal processing techniques may be substituted with equal felicity.

Although the shaft break detection system of the present invention has been described with respect to the intermediate pressure assembly 40 it is equally felicitous for the high pressure assembly, comprising the high pressure compressor 18, high pressure turbine 22 and high pressure shaft 38, and for the low pressure assembly comprising the fan 14, low pressure turbine 26 and low pressure shaft 34.

Although the present invention has been described with respect to a three-shaft gas turbine engine 10, it has equal utility for detecting shaft break in a two-shaft engine. Although described in relation to a ducted fan gas turbine engine 10, the present invention is also effective for detecting shaft break in a propeller gas turbine engine. Although described in relation to a gas turbine engine 10 to power an aircraft, the present invention can be applied with felicity to marine or industrial gas turbine engines 10.

The invention claimed is:

1. A method of detecting shaft break for a gas turbine engine, comprising the steps of:
   measuring rotational speed of a shaft of a gas turbine engine;
   calculating a first indication from the rotational speed;
   calculating a second indication from the rotational speed, wherein each of the first indication and the second indication is a Boolean logic value; and
   producing a shaft break signal if the first indication is true and the second indication is true.

2. A method as claimed in claim 1 wherein the step of measuring the rotational speed comprises sampling the rotational speed.

3. A method as claimed in claim 1 wherein the step of measuring the rotational speed of the shaft comprises measuring the rotational speed near to a compressor of the gas turbine engine.

4. A method as claimed in claim 1 wherein the first indication comprises calculating a rate of change of the rotational speed, and the first indication is true if the rate of change of rotational speed indicates deceleration greater than a threshold.

5. A method as claimed in claim 1 wherein the second indication comprises calculating a rate of change of the rotational speed and performing a frequency analysis thereon, and the second indication is true if the frequency analysis indicates no peak at a first torsional frequency of the shaft and false if the frequency analysis indicates a peak at the first torsional frequency of the shaft.

6. A method as claimed in claim 5 wherein the frequency analysis is performed by any one of the group comprising: a fast Fourier transform; applying a band-pass filter to a range centred on the first torsional frequency; and applying a low-pass, a high-pass or a Kalman filter to extract a range including the first torsional frequency.

7. A method as claimed in claim 5 further comprising the step of producing a surge signal if the first indication is true and the second indication is false.

8. A method as claimed in claim 5 wherein the first torsional frequency is calculated from inertia of parts of the shaft and torsional stiffness of the shaft.

9. A method as claimed in claim 1 wherein the second indication comprises testing a hypothesis that the shaft and its coupled components behave as a second order mechanical system, and the second indication is true if the hypothesis is false.

10. A method as claimed in claim 1 further comprising a step of calculating an additional indication from the rotational speed and modifying the final step of claim 1 to produce a shaft break signal if the first indication, second indication and additional indication are each true.

11. A method as claimed in claim 10 wherein the additional indication comprises any one of the group comprising: measuring shaft vibration wherein the additional indication is true if the vibration is greater than a threshold; measuring a second rotational speed wherein the additional indication is true if the difference between the rotational speed and the second rotational speed is greater than a threshold; and testing a hypothesis that the shaft and its coupled components behave as a first order mechanical system wherein the additional indication is true if the hypothesis is true.

12. A shaft break detection system for a gas turbine engine, comprising:
   a measuring device to measure rotational speed of a shaft;
   a processor to calculate a first indication from the rotational speed;
   a processor to calculate a second indication from the rotational speed, wherein each of the first indication and the second indication is a Boolean logic value; and
   a shaft break signal generator to generate a shaft break signal if the first indication is true and the second indication is true.

13. A shaft break detection system as claimed in claim 12 further comprising a fuel shut-off mechanism coupled to the shaft break signal generator, the fuel shut-off mechanism arranged to shut off fuel supply to the engine in response to the shaft break signal.

14. A shaft break detection system as claimed in claim 12 wherein the processor to calculate the first indication and the processor to calculate the second indication comprise one processor with multiple functions.

15. A shaft break detection system as claimed in claim 12 wherein the processor comprises an engine control unit.

16. A shaft break detection system as claimed in claim 12 further comprising:
   a measuring device to measure a characteristic of the engine;
   a processor to calculate an additional indication from the characteristic of the shaft; and
   the shaft break generator arranged to generate the shaft break signal if the first, second and additional indications are each true.

17. A shaft break detection system as claimed in claim 16 wherein the measuring device comprises any one of the group comprising: a speed probe to measure rotational speed of the shaft at another location wherein the additional indication comprises the difference in rotational speed; a pressure measuring device wherein the additional indication comprises a change in the pressure over time greater than a predetermined threshold; and a speed probe to measure rotational speed of a second shaft wherein the additional indication comprises the difference in rotational speed.

18. A gas turbine engine control system comprising a shaft break detection system as claimed in claim 12.

19. A gas turbine engine comprising a gas turbine engine control system as claimed in claim 18.

* * * * *